Nov. 26, 1968 M. SELVIN 3,413,634
AUTOMATIC FREQUENCY CONTROL FOR FREQUENCY AGILITY RADAR SYSTEM
Filed May 25, 1967
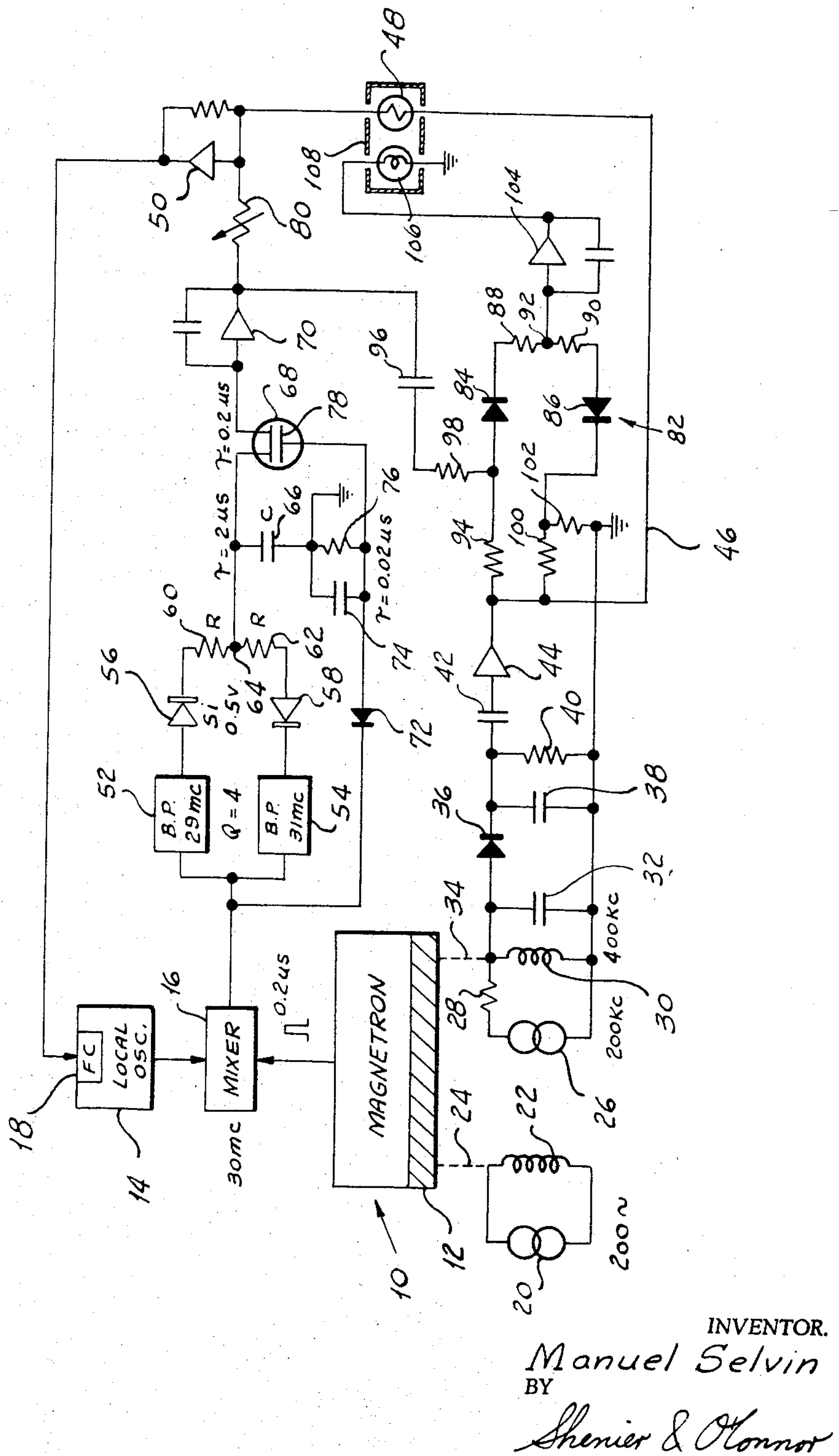
INVENTOR.
Manuel Selvin
BY
Shenier & O'Connor
ATTORNEYS 3,413,634

AUTOMATIC FREQUENCY CONTROL FOR FREQUENCY AGILITY RADAR SYSTEM

Manuel Selvin, Norwalk, Conn., assignor to United Aircraft Corporation, East Hartford, Conn., a corporation of Delaware Filed May 25, 1967, Ser. No. 641,355
13 Claims. (Cl. 343—17.1)

ABSTRACT OF THE DISCLOSURE

An automatic frequency control system for a phase interferometer radar system employing frequency agility in which a first continuous dither corrention signal is produced in response to the actuated magnetron element. A second discontinuous correction signal is obtained by first sampling the frequency of the mixer output during each transmitted pulse and before the nearest range return is received and then applying the samples to an integrator to obtain the second signal. A summing amplifier applies the combined first and second signals to the frequency control of the local oscillator. Means responsive to the second error signal controls the gain of the circuit which couples the first signal to the summing amplifier.

*Background of the invention*

There are known in the prior art phase interferometer radar systems for use in terrain avoidance installations and the like. It has been discovered that the undesirable effect of unwanted inputs or noise on the performance of the system can be reduced if the frequency of the transmitted signal is "dithered" or varied from pulse to pulse.

In such phase interferometer systems energy received by spaced horns is applied to mixers which feed respective intermediate frequency channels each comprising a plurality of stages. The intermediate frequency channels feed the system phase detector which produces the output elevation angle signal. It will readily be apparent that the two intermediate frequency channels will not have precisely the same phase shift characteristic. They are calibrated at a particular intermediate frequency by injecting a crystal controlled signal of that frequency into the channels. As a result they can be considered to have the same phase shift at the calibration frequency. It is also reasonable to assume an average phase shift difference error of about ten elctrical degrees per megacycle deviation from the particular intermediate frequency selected. This corresponds to about a one degree space error. In such a system an acceptable error in intermediate frequency would be about 1.0 mc., corresponding to one electrical degree or one-tenth of a space degree. It will be appreciated that an error of this magnitude is acceptable when one considers that the inherent magnetron error may be 50 kc. and the Doppler error may be 20 kc.

From the foregoing it will be apparent that if the transmitted frequency is varied from pulse to pulse, for optimum performance the local oscillator frequency must be correspondingly varied. To achieve such an operation, it is necessary to have a magnetron the frequency of which may readily be varied, a local oscillator, the frequency of which can be controlled rapidly, and an automatic frequency control loop which operates fast enough to control the local oscillator in the desired manner. Components fulfilling the first two of these requirements are known in the prior art.

The frequency control loop must operate sufficiently rapidly as to modify the local oscillator frequency after a transmitted pulse before the nearest range return is received. The transient performance of intermediate frequency oscillators and detectors of the prior art is not sufficiently good to achieve steady state performance of a servo loop in this required time. Thus, it has not been possible satisfactorily to control the frequency of a local oscillator with sufficient rapidity to make practical a phase interferometer radar system employing frequency agility.

I have invented an automatic frequency control arrangement especially adapted for use in a phase interferometer radar system employing frequency agility. My arrangement achieves correction of the local oscillator frequency after a transmitted pulse before the nearest range return is received. My automatic frequency control arrangement is relatively simple for the result achieved.

*Summary of the invention*

One object of my invention is to provide a frequency control arrangement which is especially adapted for use in a phase interferometer radar system employing frequency agility.

Another object of my invention is to provide a frequency control system for correcting the local oscillator frequency after a transmitted pulse before the nearest range return is received.

A further object of my invention is to provide a fast acting automatic frequency control system which is relatively simple for the result achieved thereby.

Other and further objects of my invention will appear from the folowing description.

In general my invention contemplates the provision of an automatic frequency control system for a phase interferometer radar system employing frequency agility in which I derive a first continuous dither correction signal in response to the actuated magnetron element and a second correction signal from an integrator by sampling the frequency of the mixer output during each transmitted pulse and, before the nearest range return is received, applying the samples to the integrator. A summing amplifier applies the first and second correction signals to the frequency control of the local oscillator. I provide means responsive to the second signal for controlling the gain of the circut which couples the first signal to the summing amplifier.

*Brief description of the drawing*

In the accompanying drawing which forms part of the instant specification and which is to be read in conjunction therewith, the figure is a schematic view of my frequency control arrangement applied to a phase interferometer radar employing frequency agility.

*Description of the preferred embodiment*

Referring now to the figure, the radar system with which my frequency control system is employed includes a magnetron, indicated generally by the reference character 10, adapted to produce output pulses having a pulse width of about 0.2 $\mu$s. The magnetron 10 includes a tuning element 12 adapted to be moved to vary the output frequency of the magnetron 10. In one system wherein frequency agility is employed, I may provide a frequency agility of ±25 mc. with a maximum change of frequency of 5 mc. pulse-to-pulse. The system also includes a local oscillator 14, the output of which together with the output of the magnetron 10 is applied to a mixer 16 intended to produce an intermediate frequency of 30 mc., for example. The oscillator 14 may be of any suitable type known to the art which is adapted to be driven rapidly to a new frequency in response to the application of a signal to the frequency control section 18 of the oscillator. In order to vary the frequency of the magnetron 10 to provide the desired frequency agility, I may, for example, apply the output of a generator 20 having a frequency of about 200 cycles to a coil 22 adapted to actuate the element 12 through a suitable coupling indicated schematically by the broken line 24.

In my automatic frequency control system I first provide a slow continuous correction signal for varying the local oscillator frequency so as to bring the intermediate frequency to within a predetermined error. I apply the output of a generator 26 having a frequency of about 200 kc. through a resistor 28 to a filter including an inductor 30 and a capacitor 32. A suitable coupling, indicated schematically by the broken line 24, is adapted to vary the value of the inductor 30 in response to movement of the element 12 in order to vary the resonant frequency of the filter around the frequency value to which the filter is nominally tuned. In order to ensure that I operate on a relatively linear portion of the frequency response curve of the filter, I tune the filter to a nominal frequency of twice the frequency of generator 26, or about 400 kc. and construct the filter so as to have a low Q.

I apply the signal across the filter to a peak detector including a diode 36, a capacitor 38 and a resistor 40. A capacitor 42 applies the output of the peak detector to an amplifier 44 which provides a signal on channel 46, which signal represents the variation in magnetron frequency output. A photoconductive element 48, the purpose of which will be explained hereinafter, applies the signal on channel 46 to summing amplifier 50, the output of which is applied to the control section 18 of the local oscillator 14.

I provide my frequency control arrangement with means for producing a second fast and discontinuous correction signal adapted to be combined with the signal on channel 46 accurately to control the output frequency of the local oscillator. I apply the output of the mixer 16 which has a nominal frequency of 30 mc., for example, to band-pass filters 52 and 54 which are respectively tuned to frequencies slightly displaced from the nominal frequency of the mixer on each side thereof. For example, filter 52 may be tuned to a frequency of 29 mc. while filter 54 is tuned to a frequency of 31 mc. I arrange the filters 52 and 54 to have a relatively low Q of about 4, for example.

As is known in the art, the difference in the envelope output of two band-pass filters represents the difference frequency. I employ this fact to obtain an error signal indicating the deviation of the signal output of mixer 16 from the nominal frequency. In doing this, I sample the output during the time at which the magnetron is producing an output pulse and apply the correction after the pulse has occurred. Respective oppositely poled silicon diodes 56 and 58 couple the filter outputs to resistors 60 and 62 having a common terminal 64. I connect a storage capacitor 66 between terminal 64 and ground. A field effect transistor 68 when conductive couples the signal on capacitor 66 to an integrating amplifier 70.

A diode 72 couples negative-going excursions of the output signal of mixer 16 to a biasing circuit including a capacitor 74 and a resistor 76 to bias the gate 78 of transistor 68 negative when the mixer 16 is producing an output, thus to render the transistor nonconductive during that period. Conversely, when the mixer produces no output, the biasing capacitor 74 rapidly discharges to permit transistor 68 to conduct.

With transistor 68 nonconductive as described hereinabove, diode 56 applies positive-going excursions of the signal output of filter 52 to resistor 60. Similarly, the diode 58 applies negative-going excursions of the signal output from filter 54 to resistor 62. It will readily be apparent that if the signal output of mixer 16 is at the nominal frequency of 30 mc., no resultant potential will appear at terminal 64 and capacitor 66 stores no charge. If, on the other hand, the frequency of the signal deviates in one direction or in the other direction from the nominal frequency, then capacitor 66 carries a potential indicating the deviation.

At the end of a pulse capacitor 74 returns to ground rapidly to render transistor 68 conductive to permit the integrating amplifier 70 to apply the amplified signal through a calibrating resistor 80 to the summing amplifier 50. Having in mind the pulse duration of 0.2 $\mu$s., I select the charging circuit including one of the resistors 60 and 62 and capacitor 66 to have a relatively long time constant of about 2 $\mu$s. as compared with the pulse duration to ensure good integration over the pulse. To ensure that the transistor 68 is rendered conductive relatively rapidly after the termination of a pulse, I select the discharge circuit of capacitor 74 to have a relatively short time constant of about 0.02 $\mu$s. The discharge circuit of capacitor 66 when the error is being sampled through transistor 68 is selected to have a time constant of about 0.2 $\mu$s. That is, this last time constant should provide relatively rapid discharge of capacitor 66 through transistor 68 but should not be so small as to require too large a field effect transistor or too rapid response by amplifier 70.

The summing amplifier 50 combines the relatively slow and continuous correction signal on channel 46 as well as the signal on capacitor 66, which represents the fast and discontinuous error signal, to change the frequency of the local oscillator 14 in such a way as to cause the mixer output signal frequency to approach the nominal mixer output frequency.

From the description thus far advanced, it would be thought that all of the errors in the system had been accounted for. It may happen however, that, for example, there occurs a shift in the sensitivity of the local oscillator frequency control such that a fundamental error component appears in the output of the integrator 70. If this occurs, the gain of the slow correction signal circuit including channel 46 must be changed to account for this error. I achieve this result by varying the resistance of photoconductive element 48 in response to the signal from integrator 70.

My arrangement includes a phase-sensitive detector, indicataed generally by the reference character 82, comprising respective diodes 84 and 86 and resistors 88 and 90 having a common terminal 92. A resistor 94 applies the output of amplifier 44 to the diode 84. A capacitor 96 and a resistor 98 couple the output of integrator 70 to the diode 84 to which the output of amplifier 44 is applied. A pair of voltage dividing resistors 100 and 102 provide an input to the diode 86 from amplifier 44.

During positive-going excursions of the signal from amplifier 44 both that signal and the fast correction signal are coupled by diode 84 to the resistor 88. It will readily be appreciated that the second harmonic signal in the output of integrator 70 will produce no net potential at the terminal 92. The positive-going excursion of the output of amplifier 44 will, however, produce a net potential at that terminal. During the negative-going excursion of the output of amplifier 44, only that signal is applied to the resistor 90. The result of this operation will be a cancellation of the effect at terminal 92 which resulted from the positive-going excursions of the output of amplifier 44. Thus, if the signal from integrator 70 includes no fundamental component, the net effect at terminal 92 will be zero.

If, on the other hand, the output of the integrator 70 incudes a fundamental component, this component, whether it be in phase with or out of phase with the signal from amplifier 44, will produce a net effect at terminal 92 during positive-going excursions of the output of amplifier 44. During negative-going excursions of the output of amplifier 44, however, while the effect of the positive-going portion of the output of wave 44 at terminal 92 will be canceled, there will remain that effect which was produced by the positive portion of the fundamental component of the output of integrator 70. The result of this operation is a potential at terminal 92 which is a measure of any fundamental component in the output of the integrator 70.

I apply the potential at terminal 92 to an integrating amplifier 104 which applies the potential to a lamp 106 disposed in a light-tight housing 108 with the element 48. It will be seen that the presence of a fundamental component in the output of integrator 70 will result in an increase in the illumination provided by lamp 106 to reduce the resistance of element 48 thus to increase the portion of the signal on channel 46 which is applied to the control 18 of the oscillator 14. Preferably I so select the photoconductor 18 as to have a resistance in the dark state of lamp 106 which is too high for the necessary gain. Under these conditions and considering the infinite gain of the integrator 104 a negligible error in the equilibrium state will provide the required correction.

In operation of my automatic frequency control arrangement for the phase inteferometer radar system shown, coil 22 oscillataes the tuning element 12 to vary the output frequency of the magnetron 10 over a maximum range of ±25 mc., for example, with a maximum variation of 5 mc. from pulse to pulse. In response to vibration of the element 12, the tuning of the filter, including inductor 30 and capacitor 32, varies to provide a signal, the modulation of which is a measure of the frequency variation in the magnetron output. The peak detector, including diode 36, capacitor 38 and resistor 40, provides a signal which is a measure of the frequency variation. Amplifier 44 applies the signal to channel 46 which carries the signal through the element 48 to the summing amplifier 50.

As has been explained, the magnetron output frequency will not vary in a precisely linear manner in response to the movement of element 12. During the occurrence of each transmitted pulse, the field effect transistor 78 is turned off and the two filters 52 and 54 together with diodes 56 and 58 provide a signal at terminal 64 which is a measure of the deviation of the actual mixer output frequency from the nominal value. During this time capacitor 66 samples the frequency. As has further been explained hereinabove, the time constant with which the capacitor 66 charges is relatively long as compared with the pulse duration to ensure that a good sample is obtained over the entire pulse duration. Shortly after the end of the pulse, transistor 78 conducts to apply the sample to the integrator 70. Thus, the output of integrator 70 is an accurate measure of the intermediate frequency. The calibrating resistor 80 is set to cause this signal to have the required effect on the local oscillator control 18 to produce the desired intermediate frequency.

In order to obviate the effect of any shift in the local oscillator frequency control sensitivity, I apply both the output of integrator 70 and the signal from amplifier 44 to the diode 84 of the phase-sensitive detector 82. Similarly, I apply the output of amplifier 44 to diode 84. In response to these input signals, detector 82 provides an input to integrator 104 as a measure of any fundamental error component which may be present in the output of integrator 70. This output controls the illumination of lamp 106 to control the gain in channel 46 through the medium of photoconductive element 48.

It will be seen that I have accomplished the objects of my invention. I have provided a frequency control which is especially adapted for use in a phase interferometer radar system employing frequency agility. My system corrects local oscillator frequency after a transmitted pulse and before the nearest range return is received. It is relatively simple for the result achieved thereby. It obviates poor performance which otherwise might result from the use of a frequency agility technique in a phase interferometer radar system.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a phase interferometer system having a generator producing output pulses and having a local oscillator provided with a frequency control and having a mixer providing an intermediate frequency signal in response to said generator and to said local oscillator, means responsive to said intermediate frequency signal during each generator pulse for storing a representation of the deviation of said signal from a predetermined frequency, means including a gating device for applying said stored representation to said frequency control, means operable during each pulse for disabling the device, means operable subsequent to each pulse for enabling the gating device, and means for applying the stored representation to the gating device.

2. In a system as in claim 1 in which said signal responsive means comprises a storage capacitor and in which said applying means comprises a normally conductive device and means responsive to said pulse for rendering said device nonconductive.

3. In a system as in claim 1 in which said applying means comprises an integrator.

4. In a system as in claim 1 in which said means responsive to said signal comprises a pair of band-pass filters having respective center frequencies on each side of said predetermined frequency.

5. In a system as in claim 1 in which said applying means comprises a variable resistor.

6. In a system as in claim 1 in which said signal responsive means comprises a pair of band-pass filters having respective center frequencies on each side of said predetermined frequency and means for determining the difference in the outputs of said filters.

7. In a system as in claim 1 in which said signal responsive means comprises a pair of band-pass filters having respective center frequencies on each side of said predetermined frequency, and means comprising a pair of oppositely poled diodes connected to said filters for determining the difference in the outputs of said filters.

8. In a system as in claim 1 in which said signal responsive means comprises a pair of band-pass filters having responsive center frequencies on each side of said predetermined frequency, a pair of oppositely poled diodes connected to said filters, respective resistors connected to said diodes, said resistors having a common terminal, and a capacitor connected to said common terminal for determining the difference in the outputs of said filters.

9. In a system as in claim 1 in which said applying means comprises a field effect transistor having a gate and means responsive to said pulse for applying such potential to said gate as to render said transistor nonconductive.

10. In a system as in claim 1 including means for varying the frequency of said pulse generator, means responsive to said varying means for producing a second signal, and means for applying said second signal to said frequency control.

11. In a system as in claim 1 including a movable element for varying the frequency of said pulse generator, means comprising a filter responsive to said varying means and means for applying a signal to said filter for producing a second signal, means responsive to movement of said element for varying the tuning of said filter, and means for applying said second signal to said frequency control.

12. In a system as in claim 1 including means for varying the frequency of said pulse generator, means responsive to said varying means for producing a second signal, a channel having a variable gain for applying said second signal to said frequency control, and means responsive to said representation for controlling the gain of said channel.

13. In a system as in claim 1 including means for varying the frequency of said pulse generator, means responsive to said varying means for producing a second signal, means comprising a channel having a variable gain for applying said second signal to said frequency control, means comprising a phase-sensitive detector having respective input terminals for controlling the gain of said channel, means including an integrator responsive to said representation for providing an input to one input terminal, and means for applying said second signal to the other input terminal.

References Cited

UNITED STATES PATENTS 3,290,678 12/1966 Carlsson ---------- 343—17.1

RODNEY D. BENNETT, *Primary Examiner.*

C. L. WHITHAM, *Assistant Examiner.*